(12) United States Patent
Kong

(10) Patent No.: US 6,927,781 B1
(45) Date of Patent: Aug. 9, 2005

(54) METHOD AND APPARATUS FOR AVERAGING SUB-SAMPLES

(75) Inventor: Thomas H. Kong, Mountain View, CA (US)

(73) Assignee: NVIDIA Corporation, Santa Clara, CA (US)

( * ) Notice: Subject to any disclaimer, the term of this patent is extended or adjusted under 35 U.S.C. 154(b) by 132 days.

(21) Appl. No.: 09/712,381

(22) Filed: Nov. 13, 2000

(51) Int. Cl.$^7$ ............................................. G09G 5/00
(52) U.S. Cl. ....................... 345/613; 345/611; 345/612; 345/673
(58) Field of Search ............................... 345/611, 612, 345/613, 673

(56) References Cited

U.S. PATENT DOCUMENTS 5,940,080 A * 8/1999 Ruehle et al. ............. 345/432
6,525,723 B1 * 2/2003 Deering ..................... 345/419

* cited by examiner

Primary Examiner—Matthew C. Bella
Assistant Examiner—Tam Tran
(74) Attorney, Agent, or Firm—Townsend and Townsend and Crew LLP; J. Matthew Zigmant

(57) ABSTRACT

A method of generating pixels in a graphics system including providing a plurality of sub-samples, and providing a source pixel. It is determined which of the plurality of sub-samples are covered by the source pixel, and which of the plurality of sub-samples are not covered. The sub-samples which are covered by the source pixel are filtered. The filtered sub-samples are blended with the source pixel to create a blended sub-sample, followed by the filtering of the sub-samples which are not covered by the source pixel together with the blended sub-sample.

28 Claims, 11 Drawing Sheets

METHOD AND APPARATUS FOR AVERAGING SUB-SAMPLES

BACKGROUND OF THE INVENTION

The present invention relates to methods and apparatus for averaging sub-samples in a graphics system.

The sophistication of the market for computer and video graphics and games has exploded over the last few years. The time when simple games such as "Pong" was a marketable product is far in the past. Today's garners and computer users expect realistic images, whether the images are of a football game, race track, or new home's interior. Accordingly, this appetite has focused designers' efforts to improving the graphics systems in computers and video game systems.

Increasing the realism of video requires using sophisticated anti-aliasing techniques to reduce artifacts. One method of reducing aliasing artifacts is to store several images at a slight offset from each other in memory. The images are stored as an array of binary words referred to as sub-samples, where corresponding locations in memory hold a set of sub-samples which match up with a pixel on the display. As an image of an object drawn on the display's screen it will be stored in these memory locations, and appears to the sets of sub-samples as a new image. When a source pixel first moves to a sub-sample storage location, it is combined with the existing sub-sample. The sub-samples are then filtered to produce pixels. This technique works well, but current implementations tend to be expensive. What is needed is an alternative which would reduce the cost of mitigating these artifacts.

SUMMARY OF THE INVENTION

The present invention provides a method and apparatus for generating pixels in a graphics system. Embodiments of the invention greatly reduce the circuit size and complexity of the pixel generator. For example, only one blender is required instead of the several used in many conventional systems. This reduction is achieved by inserting a filter or averaging circuit between a sub-sample memory and blender. Some or all of the sub-samples are filtered, before being blended with a source pixel. The output of the blender is then composited with the remaining sub-samples to generate a pixel.

Accordingly, in one embodiment, the present invention provides a method of generating pixels in a graphics system including providing a plurality of sub-samples, and providing a source pixel. It is determined which of the plurality of sub-samples are covered by the source pixel, and which of the plurality of sub-samples are not covered. The sub-samples which are covered by the source pixel are filtered. The filtered sub-samples are blended with the source pixel to create a blended sub-sample, followed by the filtering of the sub-samples which are not covered by the source pixel together with the blended sub-sample.

In another embodiment, the present invention provides an apparatus for generating pixels in a graphics system. The system includes a memory for storing and providing sub-samples and a graphics pipeline for providing an image, and determining which sub-samples are covered by the image, and which sub-samples are not covered by the image. Also included are a first filter for filtering covered sub-samples, a blender for blending the image with the output of the first filter, and a second filter for filtering the blender output with the sub-samples which are not covered by the image.

In yet another embodiment, the present invention provides an apparatus for generating pixels in a graphics system having a sub-sample memory and a first filter coupled to the sub-sample memory. Also included are a blender coupled to the first filter a graphics pipeline coupled to the blender, and a second filter coupled to the sub-sample memory and the blender.

Refinements to this embodiment include storing in the sub-sample memory a plurality of sub-samples which are associated with a pixel. The graphics pipeline can provide a source pixel, and determine which of the sub-samples associated with the pixel are covered by the source pixel, and which of the sub-samples associated with the pixel are not covered by the source pixel.

A better understanding of the nature and advantages of the present invention may be gained with reference to the following detailed description and the accompanying drawings.

DESCRIPTION OF THE SPECIFIC EMBODIMENTS

Figure 1:
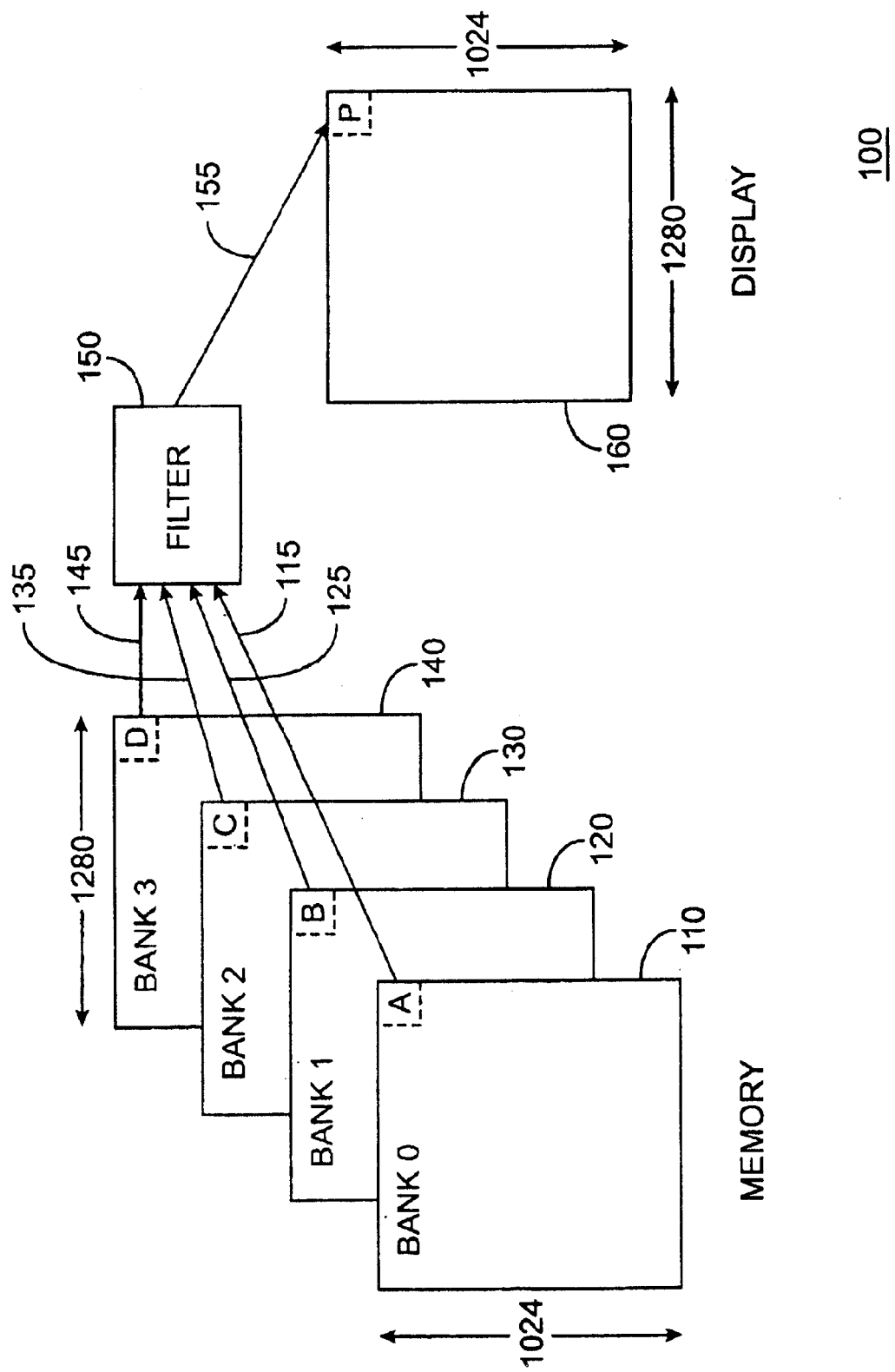
FIG. 1 is a simplified block diagram of a portion of a graphics system used for filtering sub-samples to generate pixels on a display.

FIG. 1 is a simplified block diagram of a portion of a graphics system used for filtering sub-samples to generate pixels on a display. The system portion 100 includes a memory having four banks, bank0 110, bank1 120, bank2 130, and bank3 140, as well as a filter 150, and a display 160. Each memory bank has a width and a height that corresponds to the number of pixels in display 160. In this example, the height is 1024 and the width is 1280. Alternately, the size of the memory and the size of the display may vary. For example the memory may be larger than the display where it is desirable that the image is able to be scrolled. Each memory bank provides one sub-sample, specifically "A" on line 115, "B" on line 125, "C" on line 135, and "D" on line 145, to filter 150. Other arrangements may be possible, such as 8 memory banks providing sub-samples. Also, 8 memory banks may be used where the 8 banks are in two groups of four, where each group of four outputs four sub-samples. Filter 150 averages the sub-samples A–D and produces a signal P on line 155, which appears as a pixel image on display 160. This averaging of sub-samples results in the anti-aliasing of the graphic image provided on display 160.

The image data stored in the four memory banks are near copies of each other, where the images stored are shifted a fraction of a pixel from each other. For example, B may be shifted relative to A by a fraction of a pixel to right, D may be shifted down relative to B by a fraction of pixel, and C may to the left a fraction from D. Often, A, B, C, and D have the same value, but they do differ along the edges of objects. For example, the pixel represented by these four sub-samples may be part of an image of a tree trunk. If the pixel is in the interior of the tree trunk, the values of the sub-samples are equal. If an image of a car is added to the screen, as it reaches the pixel, the pixel transitions from showing a part an image of a tree to a part of an image of the car. As the image of the car first reaches the pixel, it may cover some but not all of the four sub-samples. In that case some of the four sub-samples have different values from each other.

Figure 2:
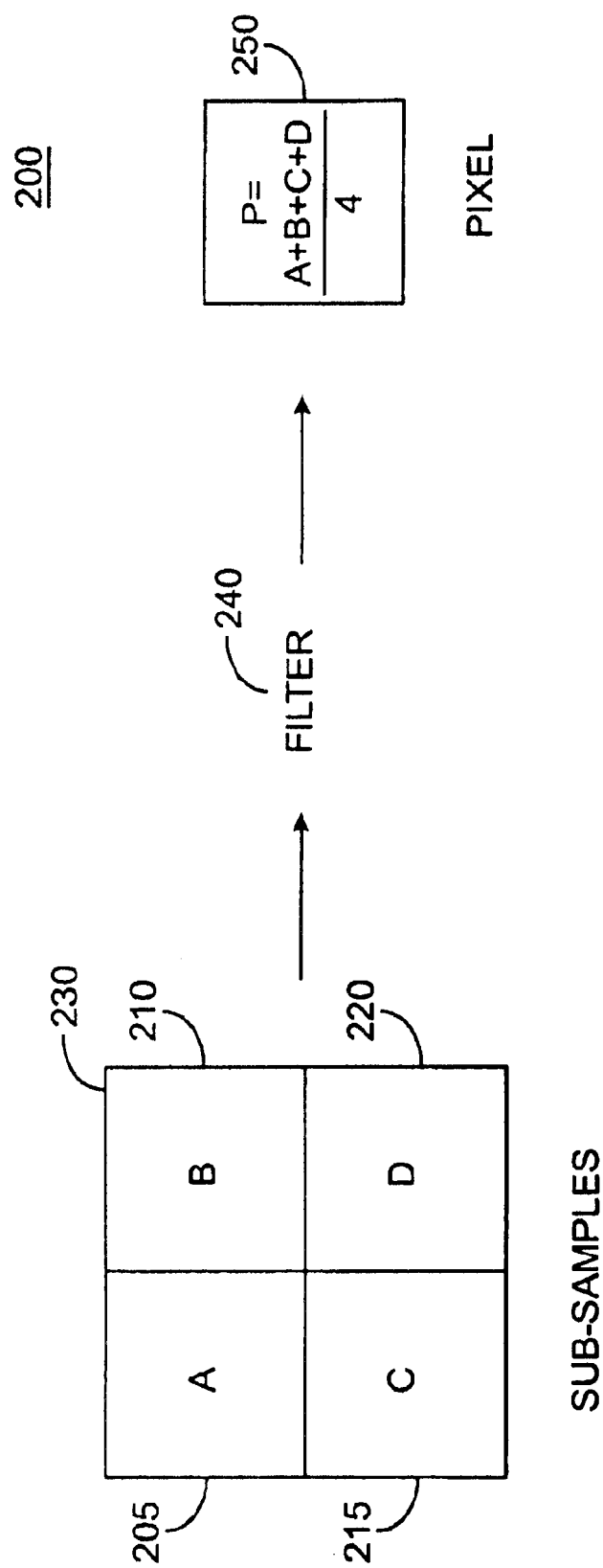
FIG. 2 is illustrative of the flow of information in the generation of a pixel in a graphics system.

FIG. 2 is illustrative of the flow of information in the generation of a pixel in a graphics system. A quad of sub-samples 230 includes sub-samples A 205, B 210, C 215, and D 220. The sub-samples 230 are provided to filter 240. The filter 240 averages the sub-samples, and provides a pixel P 250 as an output. Embodiments of the present invention may provide for a weighing of the sub-samples before filtering. The four sub-samples are may be in different memory banks, but are shown as contiguous for ease of explanation.

Figure 3:
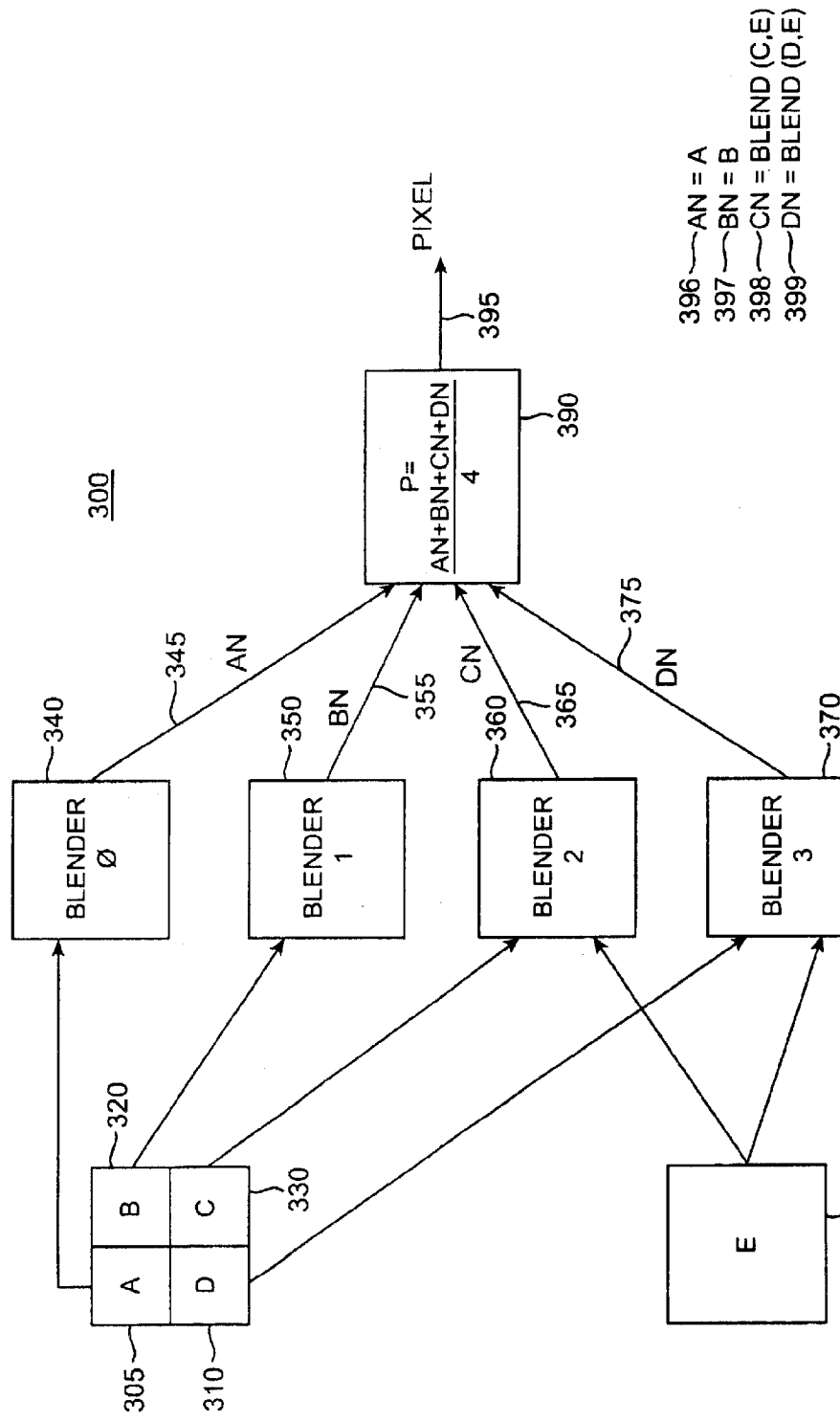
FIG. 3A is a block diagram showing circuitry used by a graphics system for determining a pixel value in an image.
FIG. 3B shows the equations for the new sub-samples generated in FIG. 3A.

FIG. 3A is a block diagram showing circuitry used by a graphics system for determining a pixel value in an image, where an object or new image is placed over a previous image. Included are previous sub-samples, or pixel sub-samples A 305, B 320, C 330, and D 310, blender0 340, blender1 350, blender2 360, blender3, 370, a source pixel E 380 from the graphics pipeline, and filtering circuit 390. In this example, the source pixel E 380, for example the car from above, is drawn over the pixel P which will be generated using the sub-samples A–D, and is now covering sub-samples C 330 and D 310. This means that E 380 is blended with the sub-samples C 330 and D 310. If the portion of the car is completely opaque,the blending is a simple substitution of E 380 for C 330 and D 310. However, the car portion may be translucent, in which case this part of the image of the car is merged with this part of the tree, and the pixel is a function of them both. Since E is not covering A 305 or B 320, they may either pass though blender0 340 and blender1 350 unchanged, or circumvent the blenders altogether. The output of the blenders arc the new sub-sample values, and are stored in sub-sample locations 305, 310, 320, and 330. The blender outputs are provided to the filter or averaging circuit 390, where they are averaged, and the pixel is generated.

FIG. 3B shows the equations for the new sub-samples. Equation 396 shows that A is unchanged, since E did not cover it. Similarly in equation 397, B is unaltered. Equation 398 illustrates that the new sub-sample CN is a blend of the previous value of C, and the source pixel E. Updated sub-sample DN is a blend of the previous D and E; equation 399.

The blending and averaging steps may be pipelined such that the sub-samples are blended in one clock cycle, and the blender outputs are averaged in the next clock cycle. While pixel n is being averaged, the next pixel n+1 may be blended. On the next clock cycle, pixel n+1 is averaged, and n+2 is blended. Alternately, the averaging, or filtering, may occur further downstream, and may not happen for a number of clock cycles, for example if there is other intervening processing. The clock cycle may correspond to the rate at which individual pixels are refreshed, which is typically many millions of cycles per second, referred to as the pixel clock. Therefore, the blenders process each pixel at a very high rate, typically moving though the image in a linear line-by-line fashion.

Figure 4:
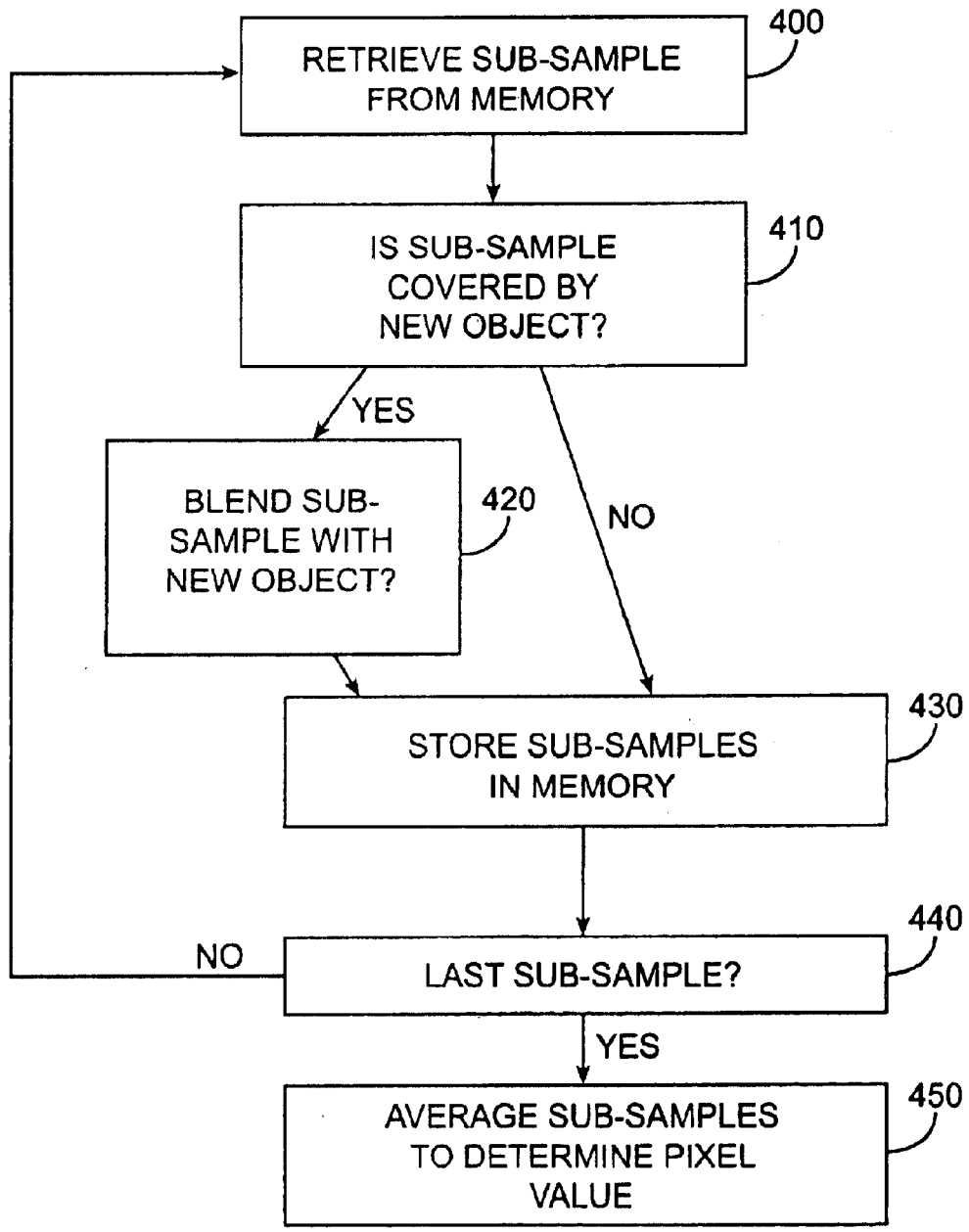
FIG. 4 is a flowchart of a method used by a graphics system for displaying pixels.

FIG. 4 is a flowchart of a method used by a graphics system for displaying pixels. A sub-sample is retrieved from memory in act 400. In many systems, all the sub-samples corresponding to one pixel are retrieved simultaneously; the steps for each are separated here for clarity. It is determined whether the sub-sample is covered by the source pixel in act 410. If it is, the sub-sample and the source pixel are blended, if not, the sub-sample is not changed. The blender outputs are stored as the new sub-sample values in act 430, and when each of the sub-samples have been processed the new sub-samples are filtered in act 450.

Figure 5:
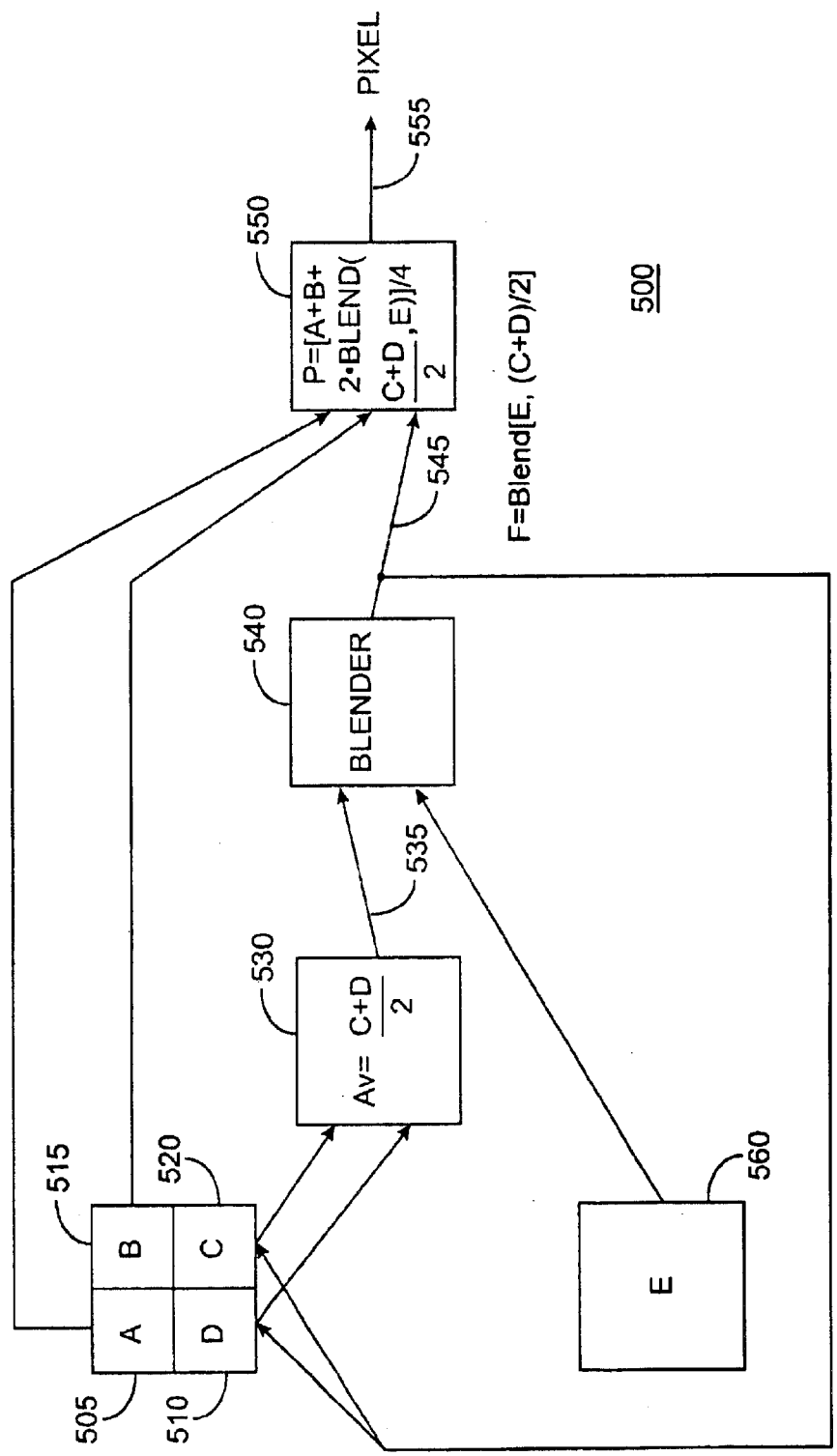
FIG. 5 is a simplified block diagram of a portion of a graphics system in accordance with an embodiment of the present invention.

FIG. 5 is a simplified block diagram of a portion 500 of a graphics system in accordance with an embodiment of the present invention. Included are sub-samples A 505, B 515, C 520, and D 510, first averaging circuits 530, second averaging circuit 550, blender 540, and source pixel E from the graphics pipeline. E has properties such as color and transparency associated with it. Again, by way of example, E covers sub-samples C 520 and D 510. Sub-samples C and D are averaged in first averaging circuit 530, which provides an output on line 535 which is coupled to an input of blender 540. E 560 also couples to an input of blender 540. Blender 540 blends the source pixel E 560 with the averaged sub-samples on line 535, and provides a blender output on line 545 which is coupled to an input of the second averaging circuit 550. Sub-samples A 505 and B 515 are also provided to inputs of second averaging circuit 550. The blender output on line 545 are stored as the updated sub-sample values D 510 and C 520. Sub-samples A 505 and B 515 remain unchanged. The averaging circuit 550 averages the non-covered sub-samples, and the blended sub-samples, to generate the pixel P on line 555.

If E is opaque the blender output is E. If the image E is translucent however, the resulting blender output on line 545 is a combination of E, C and D.

These steps may be pipelined. For example, in one pixel clock, the averaging by circuit 530 may take place. On the next pixel clock, the blending may occur. On the following clock, the pixel may be generated by averaging circuit 550. For example, in one clock cycle, pixel n may be determined by the second averaging circuit 550, pixel n+1 may have its sub-samples blended, and pixel n+2 may have its covered sub-samples averaged by the first averaging circuit. On the next clock cycle, pixel n+1 may be processed by the second averaging circuit 550, pixel n+2 may have its sub-samples blended, and pixel n+3 may have its covered sub-samples averaged by the first averaging circuit. Alternately, one or more of these steps may happen more than one clock apart, for example where there are intervening processing steps. Furthermore, the filters and blender may be made up of an amount of logic and other circuitry arranged as a pipeline, where it takes a number of clock cycles for the filtering or blending to complete. For example, each may take 4 clock cycles to compete. Then each pixel would take 12 cycles to process, and the circuits path would be processing twelve pixels simultaneously.

There are four sub-samples shown, but this is for illustrative purposes only. There may be 2, 4, 8, or any other integer number of sub-samples used to generate a pixel. A design decision as to how many sub-samples per pixel to use involves a trade off between circuit complexity and image appearance; more sub-samples require more memory banks, but yields a better image. But, the number of blenders does not necessarily increase. For example, one embodiment of the present invention uses 8 sub-samples per pixel, but only one blender. Alternately, two blenders may be used, but the number of blenders may remain less than the number of sub-samples.

In one embodiment of the present invention, if there is no source pixel E 560 from the graphics pipeline or E is opaque, the blender is bypassed and not needed. In one embodiment of the present invention this is taken advantage of such that a slower blender may be used. For example, if each sub-sample set is updated only once every 10 screen refresh cycles, a blender having only one tenth the clock rate of the pixel clock could be used. This is because a sub-sample set would need the blender only one tenth of the time, and would bypass the blender 9 times out of ten.

Figure 6:
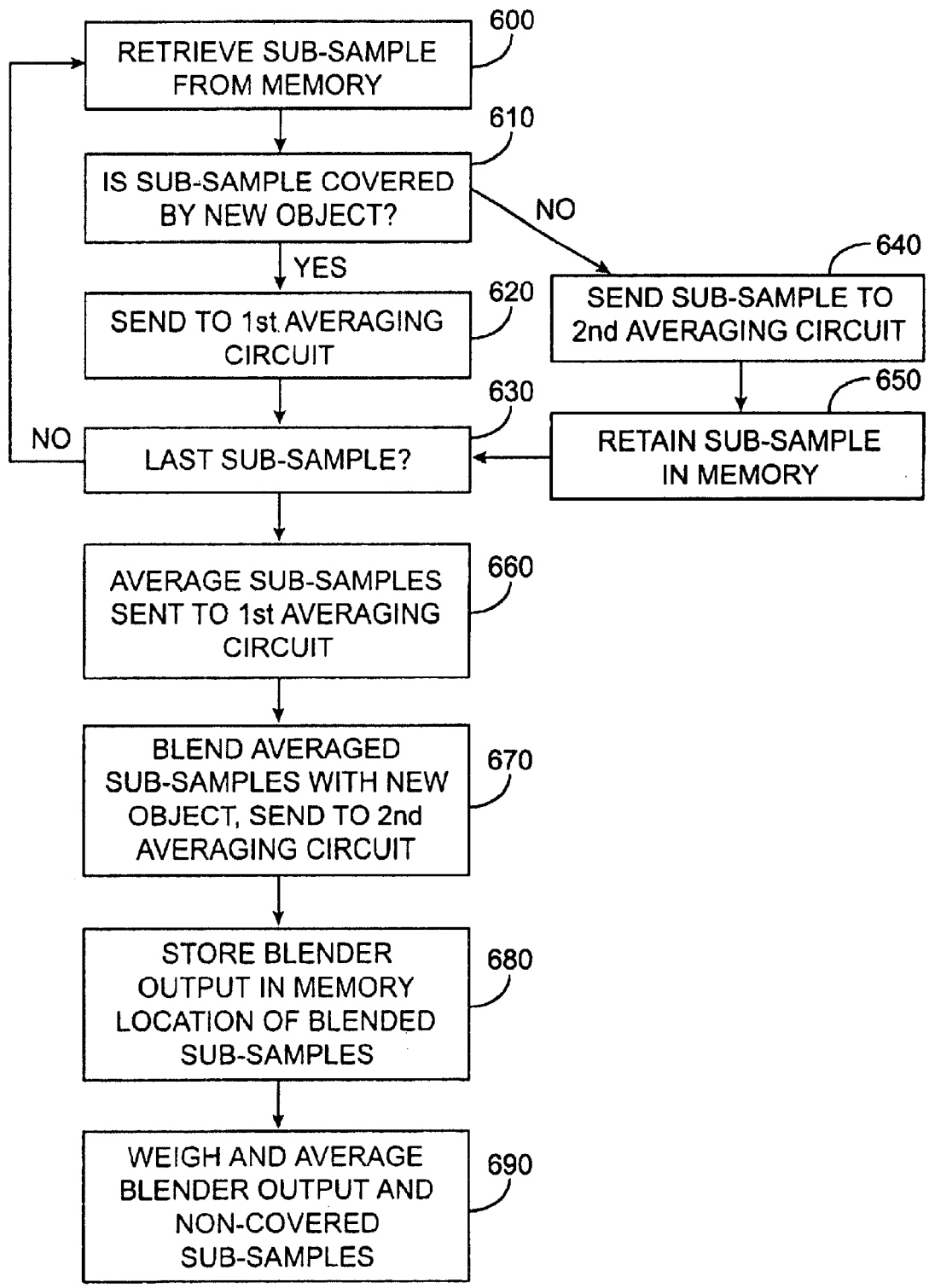
FIG. 6 is a flowchart of a method of generating pixels used by one embodiment of the present invention.

FIG. 6 is a flowchart of a method of generating pixels used by one embodiment of the present invention. A sub-sample is retrieved from memory in act 600. Again, all sub-samples may be processed in one step; they are separated out here for clarity. It is determined whether the sub-sample is covered by a source pixel in act 610. If it is, in act 640 the sub-sample is sent to the first averaging circuit. If it is not, it is sent to the second averaging circuit, and the sub-sample is retained in memory unchanged in act 650.

When all sub-samples have been processed, the sub-samples which were sent to the first averaging circuit are averaged in act 660. This average is then blended with the source pixel, and sent to the second averaging circuit in act 670. The blender output is stored in the memory location of the sub-samples which were averaged and blended with the source pixel in act 680. The blender output, and non-covered sub-samples are averaged, or filtered, to generate a pixel for a display in act 690.

At various points in the process, a value may need to be weighted, or adjusted. For example, in the second averaging circuit, if two out of 4 total sub-samples were averaged and blended with the source pixel, the blender output may be multiplied by a factor of 2 before averaging with the two non-covered sub-samples. By doing this, each non-covered sub-sample accounts for one fourth of the pixel average, instead of one third as would be the case otherwise.

FIGS. 7A–D are a conceptual block diagram of the circuit used to generate pixels by one embodiment of the present invention. The transactions between each of the blocks are shown in a step by step manner. Included are sub-samples A 705, B 715, C 710, and D 720, first averaging filter 730, blender 740, second averaging filter 750, and source pixel 760 from the graphics pipeline.

Figure 7A:
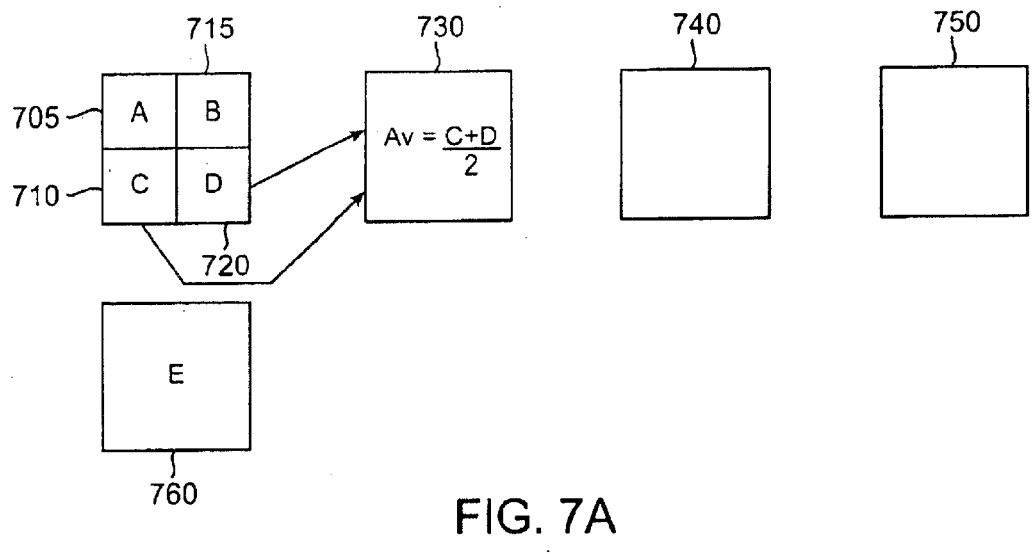
FIGS. 7A–D are a conceptual block diagram of the circuit used to generate pixels by one embodiment of the present invention.

In this example, source pixel E 760 covers sub-samples C 710 and D 720. In FIG. 7A, sub-samples C 710 and D 720 are provided to the first averaging filter 730. The average of the two, (C+D)/2 is calculated. If only one sub-sample is covered, that value would pass through the averaging circuit unchanged, for example C/1. If three sub-samples are covered, the three would be averaged by the first averaging circuit 730, i.e. (A+C+D)/3. Also, if all four sub-samples are covered, they would all be provided to averaging filter 730, which would calculate (A+B+C+D)/4.

Figure 7B:
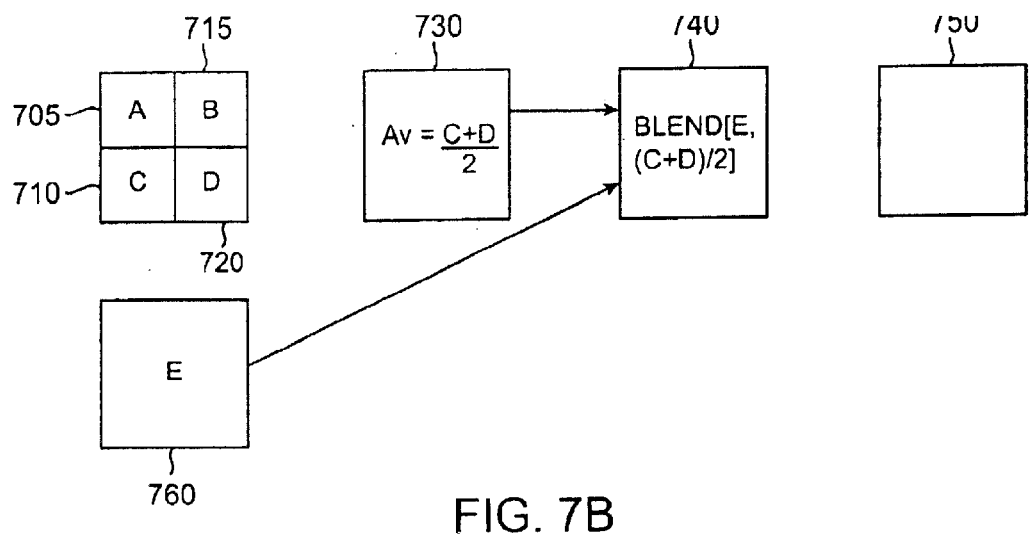

In FIG. 7B the averaged sub-samples are provided to the blender 740, along with the source pixel E 760. The blender 740 generates a blend of the two inputs by combining them appropriately. For example, if E is opaque, the value of E is output by the blender. If E has an associate translucence, or transparency, then the blender 740 outputs a blend of E and the averaged sub-samples which accounts for color and transparency.

Figure 7C:
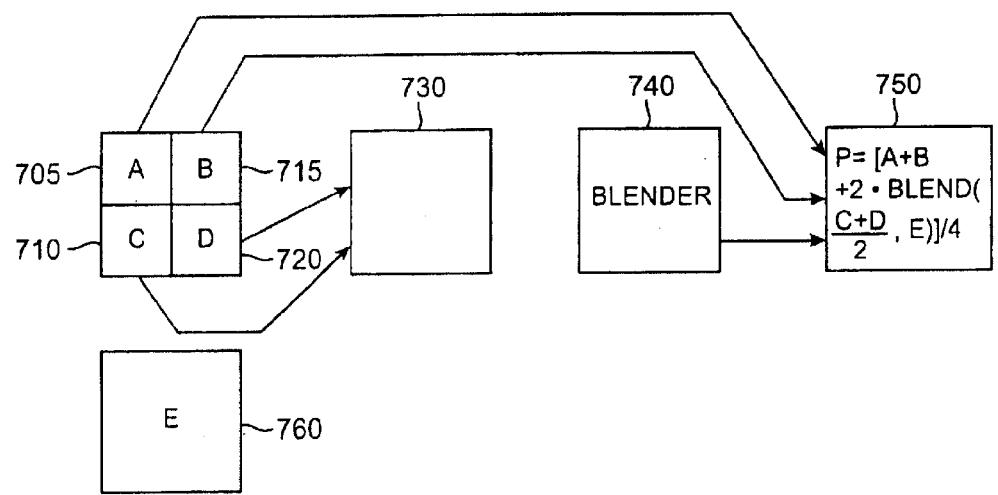

In FIG. 7C the blender 740 output F, and non-covered sub-samples A 705 and B 715, are provided to the second averaging filter 750. Second averaging filter 750 may weight the blender output appropriately, and average it with the non-covered sub-samples. There may be intervening process steps between the blender 740 and the second averaging filter 750. For example, either two-dimensional or three-dimensional texture information may be added to enhance image realism.

Figure 7D:
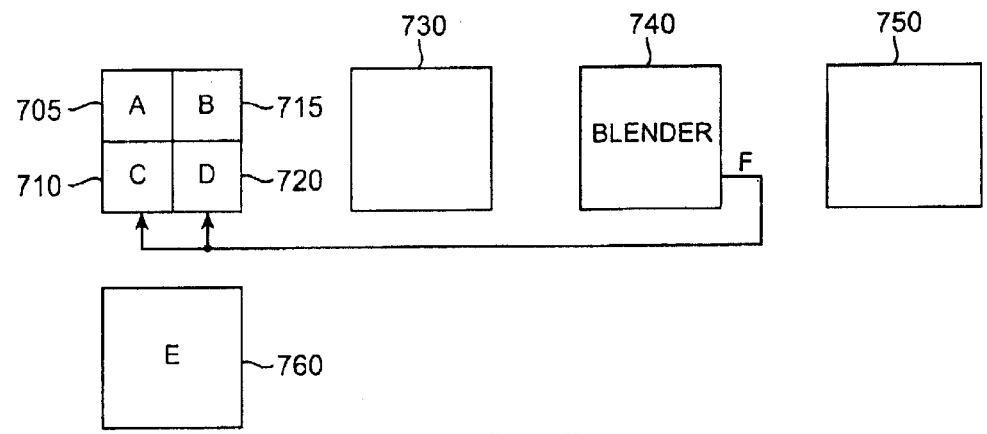

In FIG. 7D, the blender 740 output F is stored in memory as updated sub-samples C 710, and D 720. Prior sub-samples A 705 and B 715 remain unchanged.

Figure 8:
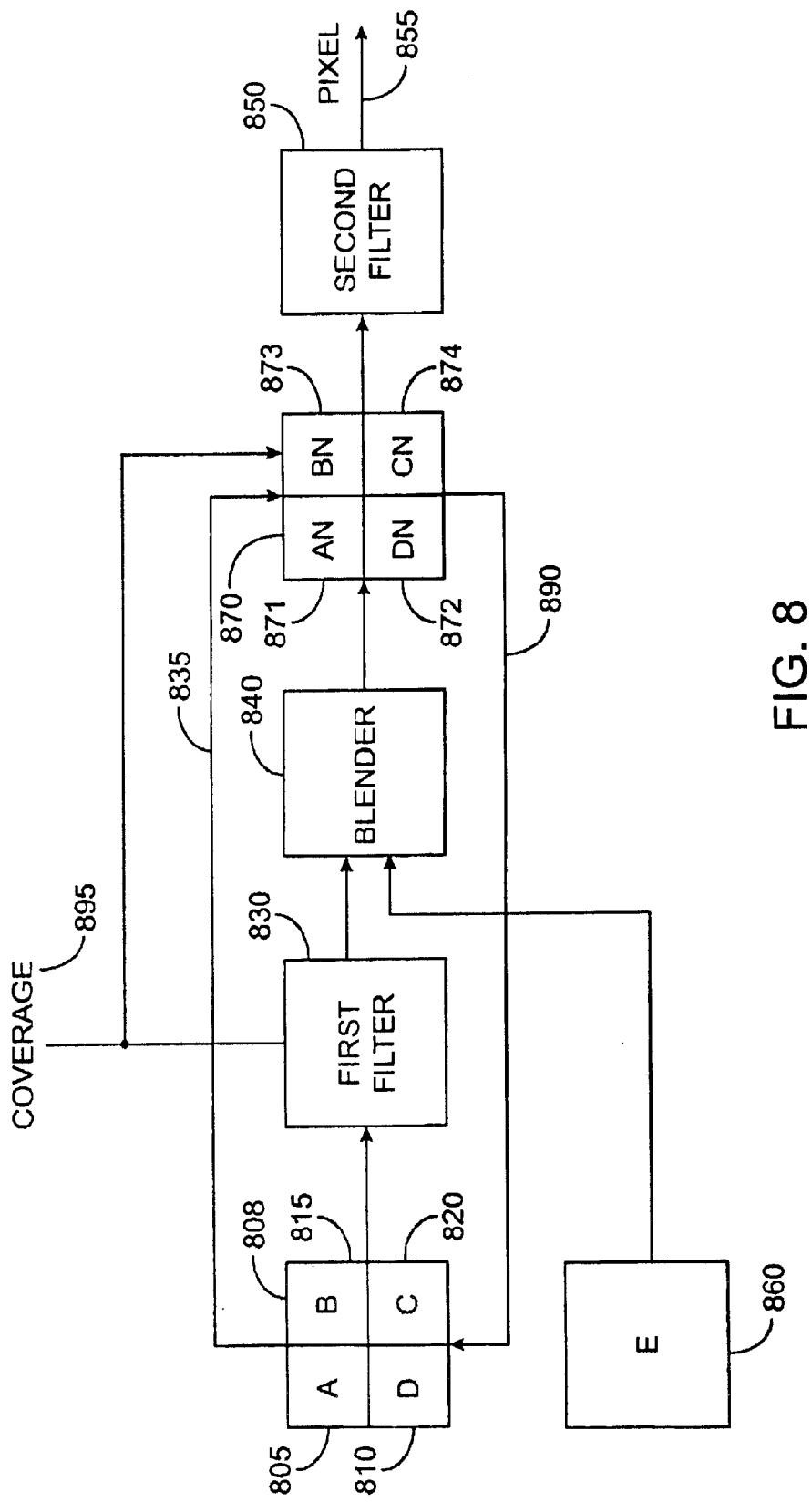
FIG. 8 is a block diagram of a system for generating pixels consistent with one embodiment of the present invention.

FIG. 8 is a block diagram of a system for generating pixels consistent with one embodiment of the present invention. Included are sub-samples A 805, B 815, C 820, and D 810, which are stored in a memory device, first filter 830, blender 840, logic block 870, second filter 850, and source pixel 860. A number of sub-samples, in this example 4, are provided to the first filter. Various numbers of sub-samples may be used; for example, 2 or 8, or any other integer number of sub-samples may be used.

The coverage signal on line 895 is used by the first filter 830 to determine which of its four inputs will be filtered. For example, the coverage signal may be four bits wide, where each bit indicates whether a corresponding sub-sample is covered. A coverage signal of "0011" may mean that A and B are not covered, and C and D are. The first filter 830 filters the appropriate sub-samples, and provides an output to the blender 840. Blender 840 blends the filtered sub-samples with the source pixel E 860, and provides a blended sample, or blend, to logic block 870.

Logic block 870 is provided a copy of each sub-sample for the pixel being processed on line 870 from the memory. Logic block 870 uses the coverage signal on line 895 to substitute the blender output for each of the covered sub-samples. For example, if C and D are covered, the blender output is substituted for C and D, and A and B are unchanged. In this way updated sub-samples AN 871, BN 873, CN 874, and DN 872 are generated. In this example, AN=A, BN=B, and CN=DN=Blend(E, (C+D)/2). These updated sub-samples are provided to the second filter 850, and are written back into the memory 808. For example, AN 871 overwrites A 805, BN 873 overwrites B 815, CN 874 overwrites C 820, and DN 872 overwrites D 810. The second filter filters the updated sub-samples, and provides a pixel output on line 855.

Figure 9:
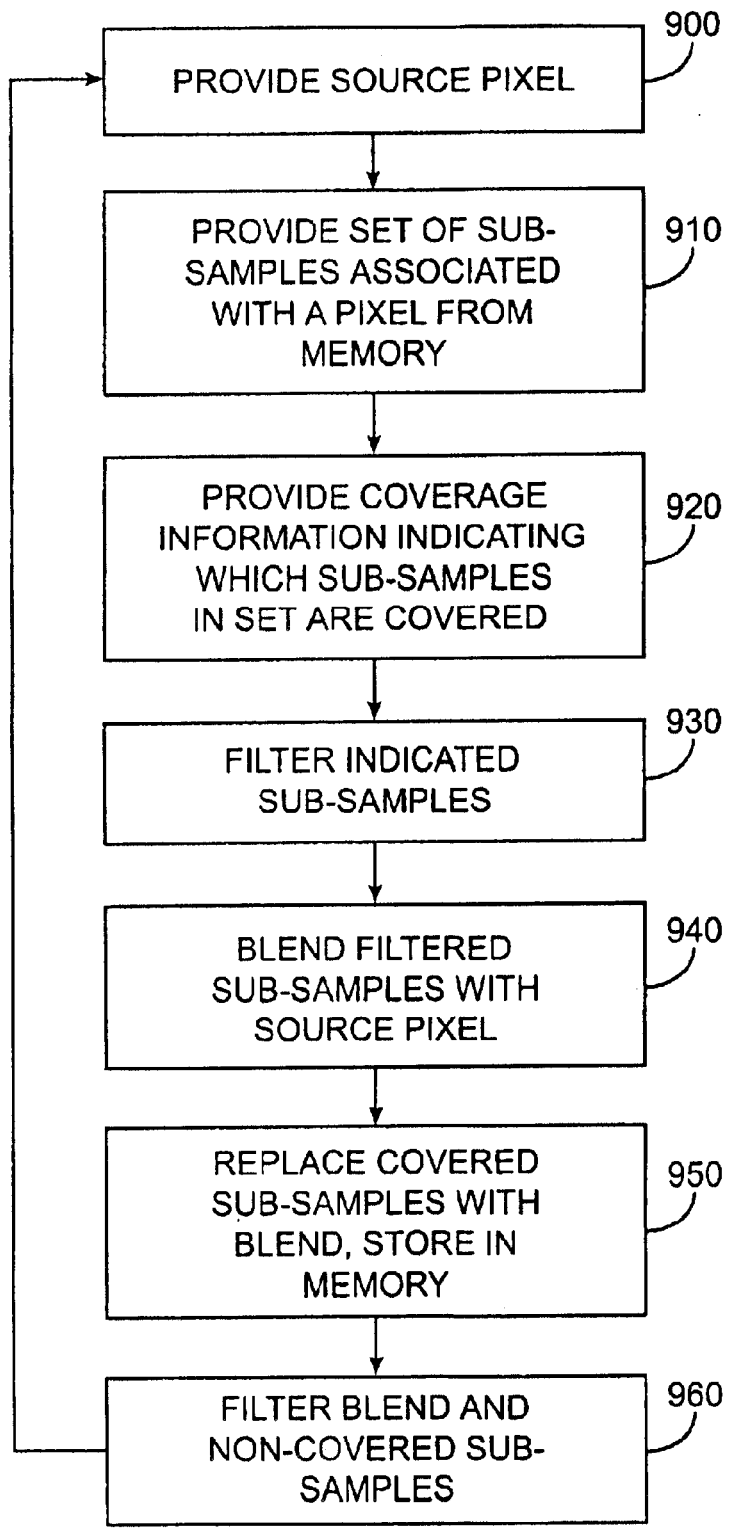
FIG. 9 is a flowchart of a method used in generating pixels by one embodiment of the present invention.

FIG. 9 is a flowchart of a method used in generating pixels by one embodiment of the present invention. A source pixel is provided in act 900, and in act 910 a set of sub-samples associated with a pixel is provided from memory. Coverage information is provided in act 920. This information indicates which sub-samples in the set are covered by the source pixel, and which are uncovered. For example, a new object may be added to an existing image being processed, and the pixel may be on the edge of the new object. Since the sub-samples are representations of the pixel but slightly offset from each other, some sub-samples may represent one pixel of the new object, the source pixel. These sub-samples are said to be covered by the source pixel. The other sub-samples which represent the existing image are said to be uncovered, or non-covered, by the source pixel. If the pixel is in the middle of the new object, all sub-samples may be covered.

In act 930, the covered sub-samples are filtered, and blended with the source pixel in act 940. The result of this blending is output and stored in memory in the locations which stored the covered sub-samples in act 950. The non-covered sub-samples remain unchanged. In act 960 the blended output and the non-covered sub-samples are filtered.

Figure 10:
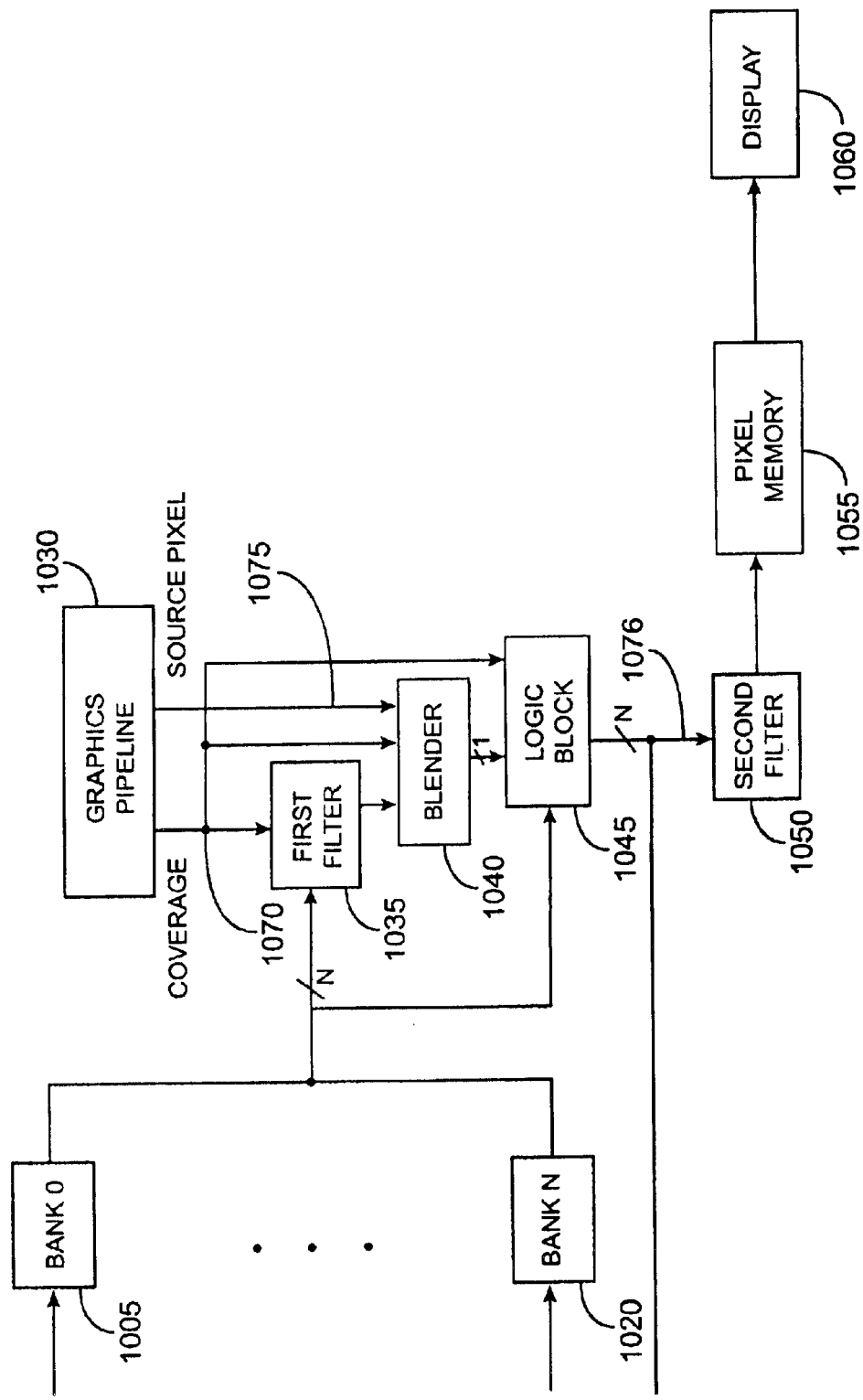
FIG. 10 is a portion of a graphics system in accordance with one embodiment of the present invention.

FIG. 10 is a portion of a graphics system in accordance with one embodiment of the present invention. Included are the number n of memory banks, specifically bank0 1005 through bankn 1020, graphics pipeline 1030, first filter 1035, blender 1040, logic block 1045, second filter 1050, pixel memory 1055, and display 1060. Sub-sample memory banks bank0 1005 to bankn 1020 each provide one sub-sample to the first filter 1035 and logic block 1045. Each memory bank may be a static random access memory (SRAM), a dynamic random access memory (DRAM), Flash memory, registers, or any other storage device. The graphics pipeline 1030 provides a source pixel on line 1075 to the blender 1040, and coverage information on bus 1070 to the first filter 1035, blender 1040, and logic block 1045.

The first filter 1035 uses the coverage information on bus 1070 to determine which of the n sub-samples received from the memory banks should be filtered. The filtering may be done by averaging the sub-samples identified as being covered by the coverage information. Alternately, other filtering may be done, for example, the covered sub-samples are individually weighted. The blender 1040 blends the first filter output with the source pixel on line 1075, and outputs a blend to the logic block 1045. Logic block 1045 substitutes the covered sub-sample values with the blend output from blender 1040, and leaves the non-covered sub-samples unchanged, thus creating updated sub-samples. Logic block 1045 provides the updated sub-samples to the memory banks bank0 1005 through bankn 1020, and the second filter 1050. Second filter 1050 filters the updated sub-samples, and provides a pixel to the pixel memory 1055. The second filter may average the updated sub-samples from the logic block 1045. Alternately, other filtering may be done, such as when the updated sub-samples are individually weighted. Pixel memory 1055 stores the stream of pixels output from the second filter, and provides them to display 1060 for image generation.

Embodiments of the present invention have been explained with reference to particular examples and figures. Other embodiments will be apparent to those of ordinary skill in the art. Therefore, it is not intended that this invention be limited except as indicated by the claims.

What is claimed is:

1. A method of generating pixels in a graphics system comprising:
   providing a plurality of sub-samples;
   providing a source pixel;
   determining which of the plurality of sub-samples are covered by the source pixel, and which of the plurality of sub-samples are not covered by the source pixel;
   filtering the sub-samples which are covered by the source pixel;
   blending the filtered sub-samples with the source pixel to create a blended sub-sample; and
   filtering the sub-samples which are not covered by the source pixel together with the blended sub-sample.

2. The method of claim 1 wherein the filtering the sub-samples which are covered by the source pixel, is done by averaging the sub-samples which are covered by the source pixel.

3. The method of claim 2 wherein the filtering the sub-samples which are not covered by the source pixel together with the blended sub-sample, is done by averaging the sub-samples which are not covered by the source pixel together with the blended sub-sample.

4. The method of claim 3 further comprising before the filtering the sub-samples which are not covered by the source pixel together with the blended sub-sample, weighting the blended sub-sample.

5. The method of claim 4 further comprising before weighting the blended sub-sample, determining the number of covered sub-samples,
   and wherein the weighting of the blended sub-sample is done by multiplying the blended sub-sample by the number of covered sub-samples.

6. The method of claim 1 further comprising replacing the sub-samples which are covered by the source pixel with the blended sub-sample.

7. An apparatus for generating pixels in a graphics system comprising:
   a memory for storing and providing sub-samples;
   a graphics pipeline for providing an image, and determining which sub-samples are covered by the image, and which sub-samples are not covered by the image;
   a first filter for filtering covered sub-samples and providing a first filter output;
   a blender for blending the image with the output of the first filter and providing a blender output; and
   a second filter for filtering the blender output with the sub-samples which are not covered by the image.

8. The apparatus of claim 7 wherein the first filter and the second filer are averaging circuits.

9. The apparatus of claim 8 wherein the second filter is also for weighting the blender output.

10. The apparatus of claim 7 wherein the blender output provides a new sub-sample, and where the new sub-sample replaces in memory the sub-samples covered by the image.

11. An apparatus for generating pixels in a graphics system comprising:
    a sub-sample memory having an first output and a second output;
    a fist filter having an output and an input, the input coupled to the first sub-sample memory output;
    a blender having an output, a first input, and a second input, the first input coupled to the first filter output;
    a graphics pipeline having an output coupled to the second blender input; and
    a second filter having a first input and a second input, the first input coupled to the second sub-sample memory output and the second input coupled to the blender output.

12. The apparatus of claim 11 wherein the sub-sample memory stores a plurality of sub-samples which are associated with a pixel, and wherein the graphics pipeline provides a source pixel, and determines which of the sub-samples associated with the pixel are covered by the source pixel, and which of the sub-samples associated with the pixel are not covered by the source pixel.

13. The apparatus of claim 12 wherein the sub-sample memory outputs on the first sub-sample memory output the sub-samples associated with the pixel which are covered by the source pixel and outputs on the second sub-sample memory output the sub-samples associated with the pixel which are not covered by the source pixel.

14. The apparatus of claim 13 wherein first filter averages the sub-samples at its input, and outputs an average, and the blender blends the signals at its inputs, and outputs a blend.

15. The apparatus of claim 14 wherein the second filter filters the sub-samples at its first input and the blend at its second input.

16. The apparatus of claim 15 wherein the second filter further comprises an output for providing a pixel.

17. A computer system comprising:
   a central processing unit (CPU);
   a main memory coupled to the CPU; and
   an apparatus for generating pixels in graphics system as set forth in claim 11, coupled to the CPU.

18. A method of generating pixels in a graphics system comprising:
   receiving a plurality of sub-samples from a memory;
   receiving a source pixel;
   receiving coverage information indicating which of the plurality of sub-samples are covered by the source pixel, and which of the plurality of sub-samples are not covered by the source pixel;
   filtering the sub-samples that are covered by the source pixel;
   blending the filtered sub-samples with the source pixel to create a blended sub-sample;
   storing the blended sub-sample in the memory, overwriting the sub-samples that are covered by the source pixel; and
   filtering the sub-samples that are not covered by the source pixel together with the blended sub-sample.

19. The method of claim 18 wherein when the sub-samples that are not covered by the source pixel are filtered with the blended sub-sample, the blended sub-sample is first multiplied by the number of sub-samples covered by the source pixel.

20. The method of claim 19 wherein the source pixels is received from a graphics pipeline.

21. A method of generating pixels in a graphics system using a single blender, the method comprising:
   receiving a plurality of sub-samples;
   receiving a source pixel;
   receiving coverage information as to which of the plurality of sub-samples are covered by the source pixel, and which of the plurality of sub-samples are not covered by the source pixel;
   filtering the sub-samples which are covered by the source pixel to generate a filtered result;
   using a single blender to blend the filtered result and the source pixel to create a blended sub-sample; and
   filtering the sub-samples which are not covered by the source pixel together with the blended sub-sample.

22. The method of claim 21 wherein filtering the sub-samples which are covered by the source pixel, is done by averaging the sub-samples which are covered by the source pixel.

23. The method of claim 22 wherein the filtering the sub-samples which are not covered by the source pixel together with the blended sub-sample, is done by averaging the sub-samples which are not covered by the source pixel together with the blended sub-sample.

24. A method of generating pixels in a graphics system comprising:
   receiving a plurality of sub-samples;
   receiving a source pixel;
   receiving coverage information as to which of the plurality of sub-samples are covered by the source pixel, and which of the plurality of sub-samples are not covered by the source pixel;
   during a first clock cycle, filter the sub-samples which are covered by the source pixel to generate a filtered result;
   during a second clock cycle, blending the filtered result with the source pixel to create a blended sub-sample; and
   during a third clock cycle, filtering the sub-samples which are not covered by the source pixel together with the blended sub-sample,
   wherein the second clock cycle occurs after the first clock cycle and before the third clock cycle.

25. The method of claim 24 wherein the filtering the sub-samples which are covered by the source pixel, is done by averaging the sub-samples which are covered by the source pixel.

26. The method of claim 25 wherein the filtering the sub-samples which are not covered by the source pixel together with the blended sub-sample, is done by averaging the sub-samples which are not covered by the source pixel together with the blended sub-sample.

27. The method of claim 26 further comprising before the filtering the sub-samples which are not covered by the source pixel together with the blended sub-sample, weighing the blended sub-sample.

28. The method of claim 27 further comprising before weighting the blended sub-samples determining the number of covered sub-samples,
   wherein the weighing of the blended sub-sample is done by multiplying the blended sub-sample by the number of covered sub-samples.

* * * * *